United States Patent
McDonald et al.

(10) Patent No.: US 11,073,620 B2
(45) Date of Patent: Jul. 27, 2021

(54) ALTERNATE UNCERTAINTY LIMITS IN THE PRESENCE OF A DETECTED SATELLITE FAULT

(71) Applicant: Honeywell International Inc., Morris Plains, NJ (US)

(72) Inventors: James Arthur McDonald, Minneapolis, MN (US); Mark A. Ahlbrecht, Champlin, MN (US); Zdenek Kana, Dubnany (CZ)

(73) Assignee: Honeywell International Inc., Charlotte, NC (US)

( * ) Notice: Subject to any disclaimer, the term of this patent is extended or adjusted under 35 U.S.C. 154(b) by 354 days.

(21) Appl. No.: 16/269,154

(22) Filed: Feb. 6, 2019

(65) Prior Publication Data

US 2020/0249361 A1  Aug. 6, 2020

(51) Int. Cl.
*G01S 19/20* (2010.01)
*G01S 19/23* (2010.01)

(52) U.S. Cl.
CPC .............. *G01S 19/20* (2013.01); *G01S 19/23* (2013.01)

(58) Field of Classification Search
CPC .......... G01S 19/20; G01S 19/23; G01S 19/24; G01S 19/14; G01S 19/32; H01Q 1/1257; G01C 15/00
USPC ........................................................ 342/352
See application file for complete search history.

(56) References Cited

U.S. PATENT DOCUMENTS

| | | | |
|---|---|---|---|
| 6,639,549 B2 | 10/2003 | Vanderwerf et al. | |
| 10,416,315 B2* | 9/2019 | Skalicky | G01S 19/20 |
| 10,760,911 B2* | 9/2020 | Kana | G01S 19/20 |
| 2008/0084348 A1 | 4/2008 | Vacher | |
| 2009/0150674 A1 | 6/2009 | Richardson et al. | |
| 2012/0013505 A1 | 1/2012 | Vourc'h et al. | |

(Continued)

FOREIGN PATENT DOCUMENTS

| | | | |
|---|---|---|---|
| CA | 2645656 A1 | 6/2009 | |
| WO | WO-2017002364 A1 * | 1/2017 | ............. G01S 19/41 |

OTHER PUBLICATIONS

European Patent Office, "Extended European Search Report from EP Application No. 20154443.4", from Foreign Counterpart to U.S. Appl. No. 16/269,154, dated May 14, 2020, pp. 1 through 13, Published: EP.

(Continued)

*Primary Examiner* — Harry K Liu
(74) *Attorney, Agent, or Firm* — Fogg & Powers LLC (57) ABSTRACT

A method for computing and applying alternative uncertainty limits is provided. The method includes generating a main solution from a plurality of received measurement signals. A solution separation is applied using a filter bank to generate sub-solutions from the received plurality of measurement signals. Each sub-solution uses all of the measurement signals from the plurality of measurement signals except one measurement signal to generate the associated sub-solution. Each sub-solution excludes a different measurement signal. One sub-solution is selected as fault free. A difference between the main solution and the selected sub-solution is determined. The determined difference is added to a rare normal protection limit to create a solution with improved integrity bounding. The solution with improved integrity bounding is then implemented.

20 Claims, 6 Drawing Sheets

(56) References Cited

U.S. PATENT DOCUMENTS

2012/0146851 A1\* 6/2012 Fernandez .............. G01S 19/02
                                                    342/357.58
2014/0292574 A1\* 10/2014 Dunik .................... G01S 19/20
                                                    342/357.58

OTHER PUBLICATIONS

Rippl, "Real Time Advanced Receiver Autonomous Integrity Monitoring in DLR's Multi-Antenna GNSS Receiver", International Technical Meeting (ITM) of the Institute of Navigation, Jan.-Feb. 2012, pp. 1767 through 1776, Newport Beach, CA.
Escher et al., "GNNS/IRS Hybridization: Fault Detection and Isolation of More than One Range failure", ION GPS, 2002, pp. 1-11, Published: Portland.
McDonald et al., "Benefits of Tightly Coupled GPS/IRS for RNP Operations in Terrain Challenged Airports", May 5-8, 2008, pp. 1-10, Published: CA.
Call et al., "Performance of Honeywell's Inertial/GPS Hybrid (HIGH) for RNP Operations", Apr. 25-27, 2006, p. 1-12, Published: CA.
European Patent Office, "Communication pursuant to Article 94(3) from EP Application No. 20154443.4", from Foreign Counterpart to U.S. Appl. No. 16/269,154, dated Nov. 2, 2020, pp. 1 through 9, Published: EP.

\* cited by examiner

ALTERNATE UNCERTAINTY LIMITS IN THE PRESENCE OF A DETECTED SATELLITE FAULT

BACKGROUND

Global Navigation Satellite Systems (GNSS) broadcast signals from a plurality of satellites using Code Division Multiple Access (CDMA) where a signal from each satellite is identified by a unique pseudorandom code (spreading code). At a GNSS receiver, overlapping signals from all satellites are processed to determine navigation measurements, such as receiver position and velocity measurements. The processing involves first searching for the presence of a signal and an estimation of its frequency offset and code offset relative to a reference clock (acquisition) and then refining the estimates, demodulating the received data and determining the GNSS receiver position (tracking). Both acquisition and tracking involve correlating received signals with a locally generated version of the pseudo random codes over an integration period.

A minimum of four GNSS satellites are needed to compute a receiver position (latitude, longitude, and altitude) and GNSS system time. The more satellites available to the receiver, the more accurate the navigation measurements. Determining accurate locations based on GNSS is becoming more critical as more and more systems are using GNSS for location and navigation. Integrity limits may be used to ensure accuracy of a measurement within a limit. For example, per the RTCA DO-316, the industry standard for a horizontal uncertainty level is an estimate of the horizontal position uncertainty, based on measurement inconsistency that bounds the true error with high probability (at least 99.9 percent).

Errors can occur in satellite signals. Currently, if a satellite signal from satellite has been detected as faulty, and it has not been excluded from the system, an integrity limit around determined navigation parameters are increased several orders of magnitude to account for the inaccuracy due to the faulty signal. An integrity limit is an estimate of the uncertainty of a measurement.

This integrity limit can be undesirable to certain users of the navigation equipment because it may prevent certain operations which could have been safely executed even with the fault present.

SUMMARY

The following summary is made by way of example and not by way of limitation. It is merely provided to aid the reader in understanding some of the aspects of the subject matter described. Embodiments provide methods and systems that use alternative uncertainty limits to maintain integrity bounding of a navigation solution in the present of a detected faulty signal that has not been excluded from a navigation solution.

In one embodiment, a method for determining and applying alternative uncertainty limits in the presence of a detected satellite fault it provided. The method includes receiving satellite signals from a plurality of satellites; generating a main solution from the received satellite signals; applying a solution separation to generate sub-solutions from the received satellite signals, each sub-solution using all of the satellite signals from the plurality of satellites except one satellite signal from one of the plurality of satellites to generate the associated sub-solution, wherein each sub-solution excludes a different satellite signal from a different satellite from another sub-solution; selecting one sub-solution as fault free; determining a sub-solution integrity bound of the selected sub-solution; determining a difference between the main solution and the selected sub-solution; adding the determined difference to the sub-solution integrity bound to create an improved integrity bounding main solution; and implementing the improved integrity bounding main solution.

In another example embodiment, another method for computing and applying alternative uncertainty limits. The method includes generating a main solution from a plurality of received measurement signals; applying a solution separation using a filter bank to generate sub-solutions from the received plurality of measurement signals, each sub-solution using all of the measurement signals from the plurality of measurement signals except one measurement signal to generate the associated sub-solution, wherein each sub-solution excludes a different measurement signal; selecting one sub-solution as fault free; determining a difference between the main solution and the selected sub-solution; adding the determined difference to a rare normal protection limit to create a solution with improved integrity bounding; and implementing the solution with improved integrity bounding.

In yet another embodiment, a navigation system for a vehicle using alternative uncertainty limits in the presence of a detected satellite fault is provided. The navigation system includes at least one receiver, at least one controller, a memory and a navigation control system. The at least one receiver is configured to receive a plurality of measurement signals from a plurality of satellites. The at least one controller is configured to: generate a main solution from a plurality of received measurement signals and apply a solution separation using a filter bank to generate sub-solutions from the received plurality of measurement signals, wherein each sub-solution uses all of the measurement signals from the plurality of measurement signals except one measurement signal to generate the associated sub-solution, further wherein each sub-solution excludes a different measurement signal, select one sub-solution as fault free, determine a difference between the main solution and the selected sub-solution, and add the determined difference to a rare normal protection limit to create a solution with improved integrity bounding. The memory is used to at least in part store instructions implemented by the at least one controller. The navigation control system is configured to have at least in part operational control of the vehicle based at least in part on the solution with improved integrity bounding determined by the at least one controller.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide a system that enables a user to maintain integrity bounding of a navigation solution (e.g. position, velocity and attitude) in the present of a detected faulty signal that has not been excluded from a navigation solution. In an aircraft example with a GNSS, embodiments enable operators to safely continue certain airborne operations that would not be possible with the current state of the art. An example of an airborne operation that may be safely performed is Required Navigation Performance (RNP) approaches. Benefits include improved cost savings through reduced user missed approaches and the prevention of loss of continuity events.

Figure 1:
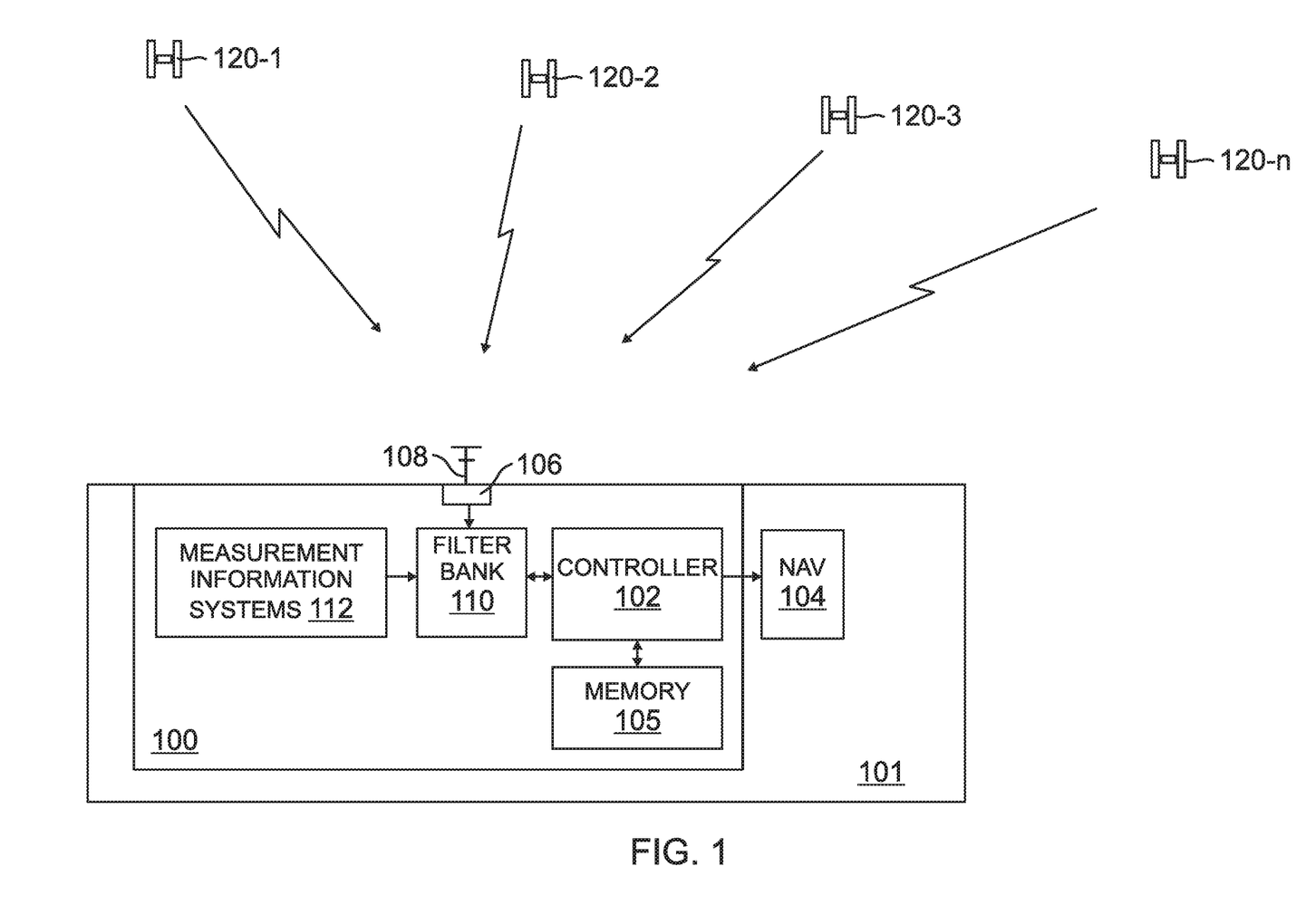
FIG. 1 is a block diagram of vehicle with a navigation system that uses alternate uncertainty limits in the presence of a detected fault according to one exemplary embodiment.

An example vehicle 101 with a navigation system 100 that uses alternate uncertainty limits in the presence of a detected fault is illustrated in FIG. 1. In this example embodiment, the navigation system 100 includes a controller 102 that implements instructions relating to the uncertainty limits in the presence of a detected fault stored in memory 105. In general, the controller 102 may include any one or more of a processor, microprocessor, a digital signal processor (DSP), an application specific integrated circuit (ASIC), a field program gate array (FPGA), or equivalent discrete or integrated logic circuitry. In some example embodiments, controller may include multiple components, such as any combination of one or more microprocessors, one or more controllers, one or more DSPs, one or more ASICs, one or more FPGAs, as well as other discrete or integrated logic circuitry. The functions attributed to the controller 102 herein may be embodied as software, firmware, hardware or any combination thereof. The controller 102 may be part of a system controller or a component controller. The memory 105 may include computer-readable operating instructions that, when executed by the controller 102 provides functions of the vehicle. Such functions may include the functions of using alternate uncertainty limits in the presence of a detected fault described below. The computer readable instructions may be encoded within the memory 105. Memory 105 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

The vehicle 100 of the example of FIG. 1, further includes at least one receiver 106 that is coupled to at least one antenna 108. The antenna 108 is configured to receive satellite signals from a plurality of satellites 120-1 through 120-$n$ used for navigation. It is common that that 10 or more satellites are available at a select time that generate measurement signals received by the antenna 108. The vehicle may include additional measurement systems, such as but not limited to radar systems, inertial systems, communication systems that receive measurement signals from other external source, etc. that provide additional measurement signals 112 to the vehicle 100. Measurement signals from the at least one receiver 106 and any additional measurement signals from the measurement information systems are communicated to a filter bank 110. The controller 102 is in communication with the filter bank 110. Further illustrated in the vehicle 100 is a navigation control system 104 which is configured, in an example embodiment, to control operational control of the vehicle based at least in part on determined navigation solution parameters determined by the controller based on received measurement signals. The operational controls may include, but are not limited to, vehicle directional control, altitude control, velocity control, acceleration control etc. In one embodiment, the navigation control system 104 further includes a display configured to display information related to the determined navigation solution parameters determined by the controller based on the received measurement signals.

The filter bank 110 is used to provide a solution separation. In one embodiment, the filter bank includes a hierarchy of Kalman filters. Other type of filters and solutions may be used in other embodiments, such as but not limited to least square filters. An illustration of the solution separation 200 known in the art is provided in FIG. 2. The filer bank 110 filters the measurement signals used by the controller 102 in determining parameters such as position, velocity, attitude, etc. The solution separation 200 is illustrated a providing a full solution 202, indicated by 0,0, in which all measurement signals are used to determine the solution. The solution separation 200 further includes sub-solutions 204 indicated by 0,1; 0,2; 0,N. Each sub-solution 204 uses all measurement signals except one to determine the respective sub-solution. Further illustrated in the solution separation 200 is sub-sub-solutions 206 indicated by 1,2; 1,3; 1,N; 2,1; 2,3; 2,N; N,1; N,2; and N,N−1. Each sub-sub-solutions 206 uses all the measurements used in an associated sub-solution 204 except one measurement to determine the sub-sub solution.

Generally, embodiments are hereinafter described as using measurement signals that originate from the plurality of satellites 120. However, measurement signals may originate from other sources, such as from the measurement information system 112 discussed above, in other embodiments.

Figure 2:
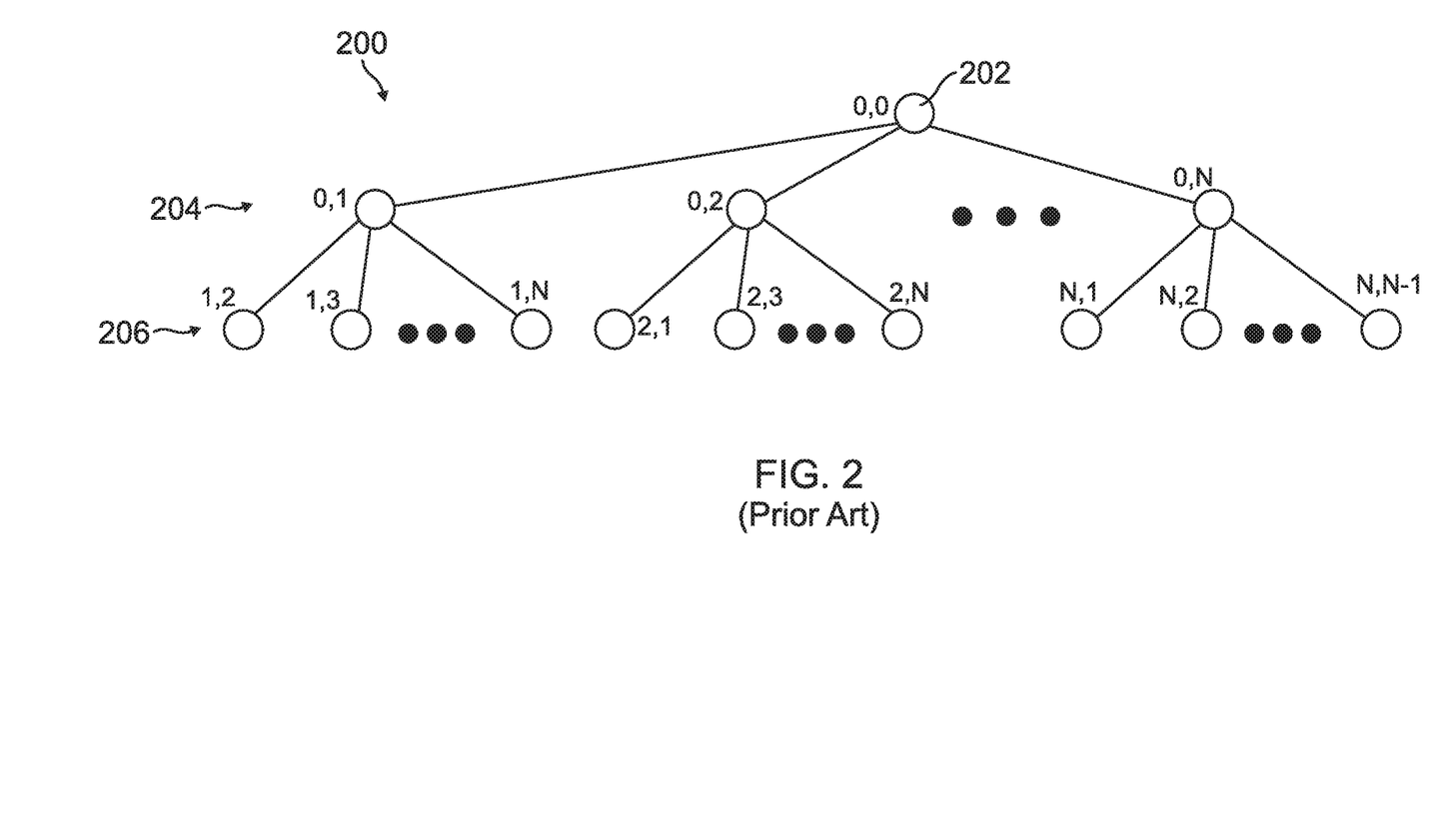
FIG. 2 is a solution separation according to the prior art.

The solution separation 200 may be used to identify faulty measurement signals from faulty satellites. This done by comparing solutions. For example, comparing the full solution 202 which uses all measurement signals from all satellites against each sub-solution 204 will identify satellite measurement error(s). That is, if there is one faulty measurement (from one faulty satellite) the full solution 202 will include the faulty measurement but one of the sub-solutions 204 will not include the faulty measurement. The difference between the full solution 202 and the sub solution 204 without the faulty measurement signal, indicates a faulty measurement signal was received. The solution separation 200 may further be used to identify which satellite is responsible for the faulty signal by using the third sub-sub solution 206.

Typically when a solution separation application finds an error (such as a satellite fault) in a received measurement signal, the measurement signals from that satellite is excluded when determining a parameter solution that is used by the vehicle or the solution is not used at all. However, embodiments allow for the use of a solution even if a fault is detected and not excluded by maintaining a desired integrity bounding. This allows the vehicle to continue certain no-critical operations even with a satellite fault present.

The probability of a satellite fault or error is generally low, for example in the $10^{-4}$ per hour range. For safety reasons in some critical applications the probability of a single error can't be ignored. However, this low error rate is not so probable that two faults occurring at the same time need to be considered in most non-critical applications. A first embodiment uses this fact that the probably of two faulty satellite measurement signals is low. This first embodiment maintains the use of a parameter solution with the detection of satellite fault by simply inflating an associated uncertainty limit based on industries standards for a particular operation. For example, a typical desired integrity limit bounding may be in the $10^{-7}$ order bound. With a detected satellite fault, the integrity limit bounding may be in the $10^{-3}$ order bound. For operations that only require an integrity limit bounding in the order of $10^{-3}$ embodiments allow the use of the parameter solution even with the presence of the fault. For other critical operations the parameter solution with a detected satellite fault cannot be used. For example, an integrity bounding of $10^{-3}$ is not acceptable for attitude states since loss of integrity and continuity for attitudes (meaning a loss of displays driven by attitudes) is categorized as a catastrophic hazard.

Other embodiments leverage knowledge that at least one sub-solution of the solution separation will be fault free. In these embodiments, protection levels are bound to the navigation solution when a fault has been detected but has not been excluded. For example, the main solution provides a parameter, such as position while at the same time it produces an integrity limit (uncertainty limit) around that position. An embodiment for determining the uncertainty limit is illustrated in the alternate uncertainty limit (AUL) flow diagram 300 of FIG. 3. The AUL flow diagram 300 is provided as a series of sequential steps. The sequence may occur in a different order in other embodiments. Hence, embodiments are not limited to the specific sequential order of steps.

Figure 3:
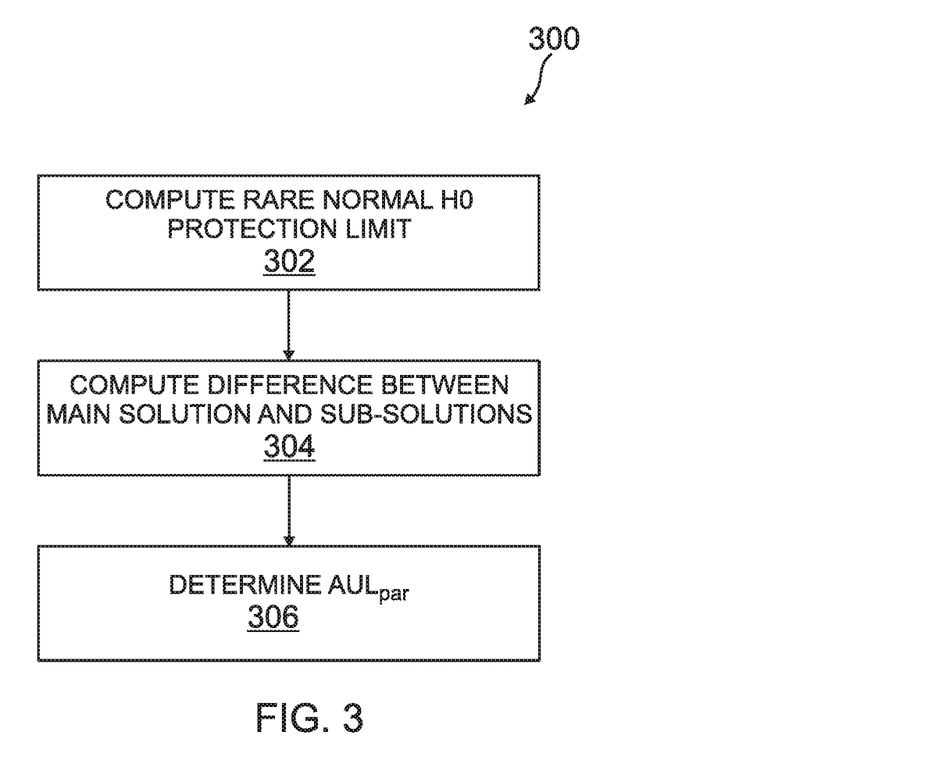
FIG. 3 is an alternative uncertainty limit flow diagram according to one exemplary embodiment.

At step (302), a rare normal hypothesis (H0) protection limit is computed for each sub-solution. With a rare normal H0 protection limit, no faults are present but we assume a significant amount of Gaussian noise is present which could occasionally occur. For example, amount of noise may be in the order of six sigma for a $10^{-7}$ bound limit. This is represented by the following:

$$K_{ff} \sim 6 \text{ for } 10^{-7}$$

The rare normal H0 protection limit (PL) can be represented by the following equation:

$$PL_{par\_ff} = K_{ff} \times \sqrt{P_{par}}$$

Where par is the parameter (i.e. position, velocity, attitude etc.) and $P_{par}$ equals a covariance for the "par" state.

The difference between the main solution and sub-solution states are then determined at step (304). An example equation to determine difference is as follows:

$$\Delta_{par} = |X_{par\_main} - X_{par\_sub\_n}|$$

The AUL is then determined in step (306). An example of an equation to determine the AUL is as follows:

$$AUL_{par} = H0' = \max \text{ from all sub-solutions } (PL_{par\_ff} + \Delta_{par})$$

The $\Delta_{par}$ used to determine $AUL_{par}$ is largest (maximum) result obtained since that will ensure the associated sub-solution was fault free. That is, the sub-solution with the greatest difference from the main solution indicates the measurement signal that is faulty is not present in the sub-solution.

For an example of how the AUL works, assume the solution parameter relates to a horizontal position. If the fault free sub-solution has a 100 meter protection limit and the $\Delta_{par}$ is 10 meters (because there is a fault measurement present and used in determining main solution), embodiments add the 10 meters to the 100 meters so the new protection limit about the main solution is 110 meters.

Figure 4:
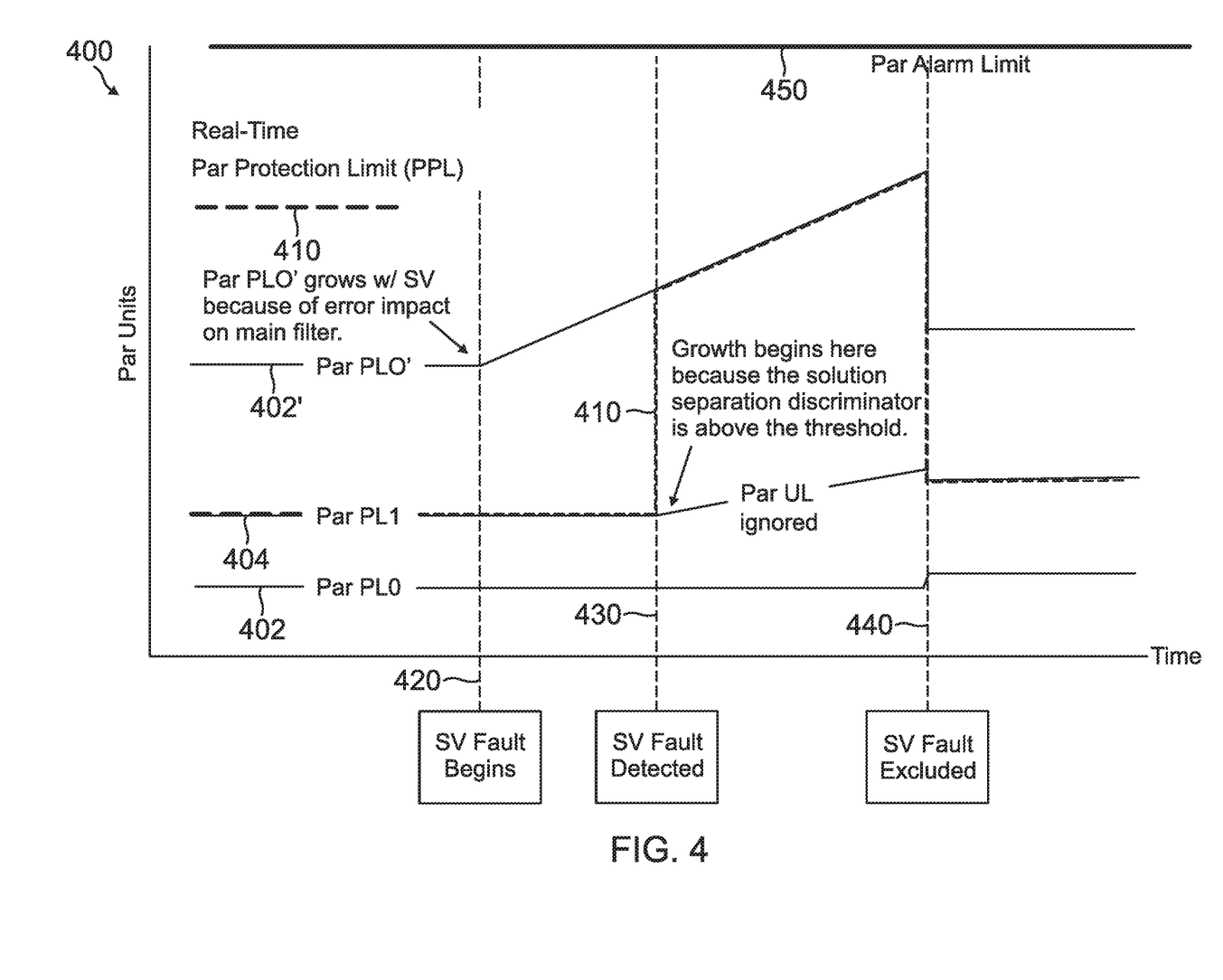
FIG. 4 is a parameter vs time graph according to one exemplary embodiment.

A par unit vs. time graph 400 of FIG. 4 illustrates and example of the par protection limit H0'. Graph 400 graphs two different protection limits (PL) for two different parameters (par) 402, 404 such as position and velocity. As illustrated, the PL of each different par 402 and 404 may differ in response to when a fault begins 420, when fault is detected 430 and when the fault is excluded 440. Par protection limit (PPL) 410 illustrates a protection limit example that may be output by a device implementing embodiments described herein. Prior to a detection event, the Par PL1 is better to use since it is lower as illustrated in graph 400. The jump in the Par PL1 410 at 430 illustrates that the protection limit output by the device jumps from the Par PL1 computed limit to the Par PL0' because of a detected space vehicle (SV) fault (satellite fault). At this point, since a fault is present, protection limit is switch to the Par PL0' term since PL1 term is no longer valid. The par alarm limit 450 is generated from a covariance of the different solutions along with an inflation factor to avoid nominal Gaussian noise from triggering an alarm. In embodiments, a discriminator formed. When a fault is detected at 430, the real time PPL rises and when it goes above the threshold we call it a detection.

Figure 5:
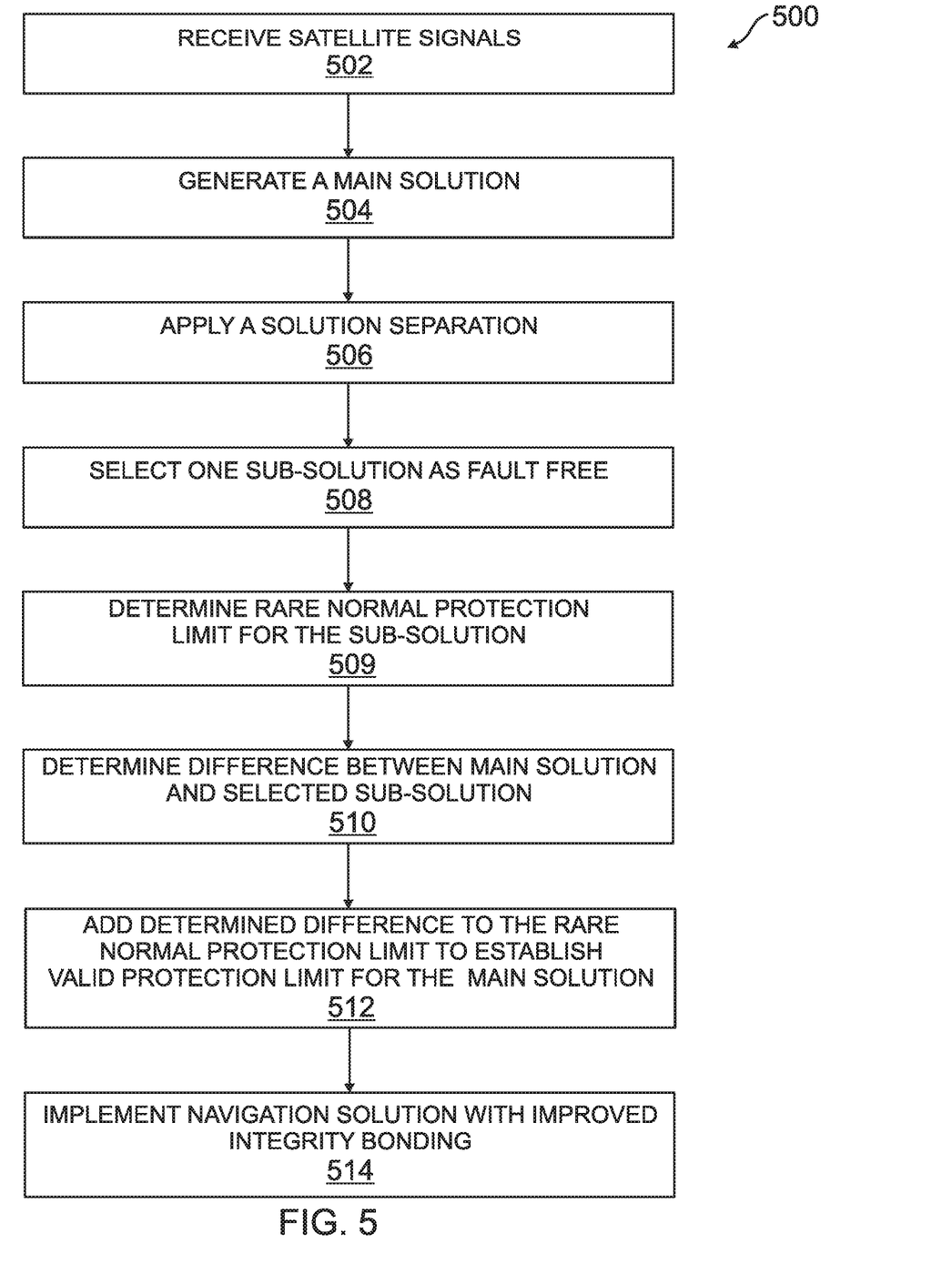
FIG. 5 is an alternative uncertainty limit flow diagram according to another exemplary embodiment.

Referring to FIG. 5, an ALU flow diagram of another embodiment is illustrated. The AUL flow diagram 500 is provided as a series of sequential steps. The sequence may occur in a different order in other embodiments. Hence, embodiments are not limited to the specific sequential order of steps.

The process starts at step (502), when satellite measurement signals are received from the plurality of satellites. From the received signals, a main solution is generated at step (504). The main solution 202 includes all the satellite signals received (that are available) in determining a parameter such as, position, velocity, attitude etc. A solution separation is applied at step (506) to generate sub-solutions 204. Each sub-solution 204 is determined by using all of the satellite signals from the plurality of satellites except one satellite. The excluded satellite signal (or measurement signal) from the associated except one satellite is unique to each sub-solution 204. Stated another way, each sub-solution 204 excludes a different signal from a different satellite from another sub-solution 204.

The process then continues by selecting one of the sub-solutions 204 as fault free at step (508). In one embodiment, a bounding limit is used in selecting the fault free sub-solution 204. The bounding limit is a protection limit. At step (509) a rare normal protection limit for the selected fault free sub-solution is determined. In one embodiment the rare normal protection limit is based on a desired integrity bound. A difference is then determined between the main solution and the selected fault free sub-solution at step (510). The determined difference is added to the rare normal protection limit to establish a valid protection limit for the main solution at step 512. The solution is then implemented with improved integrity bounding at step (514). That is, the solution may be implemented by the navigation control system 104 if its integrity bounding is acceptable for a defined operation.

The above embodiments assumes that only one satellite failure at a time is likely to occur since the probability of two satellite failures is unlikely. However, in some situations there might be a need to have improved integrity that take two failures into consideration. For example, the desire for improved integrity may be needed when dual GNSS constellations are used or when two different GPS systems are be used, such as the European system combined with the US system or when some other measurement signal generating system besides GPS is being used.

In the presence of two satellite faults, embodiments construct a protection limit based on the main solution 202, the sub-solutions 204 and sub-sub-solutions 206 of the solution separation 200 as illustrated in FIG. 2. Embodiments cover a scenario where both faults occur at the same time as well as simultaneously. Embodiments of the dual fault uncertainty limit also covers single faults.

Figure 6:
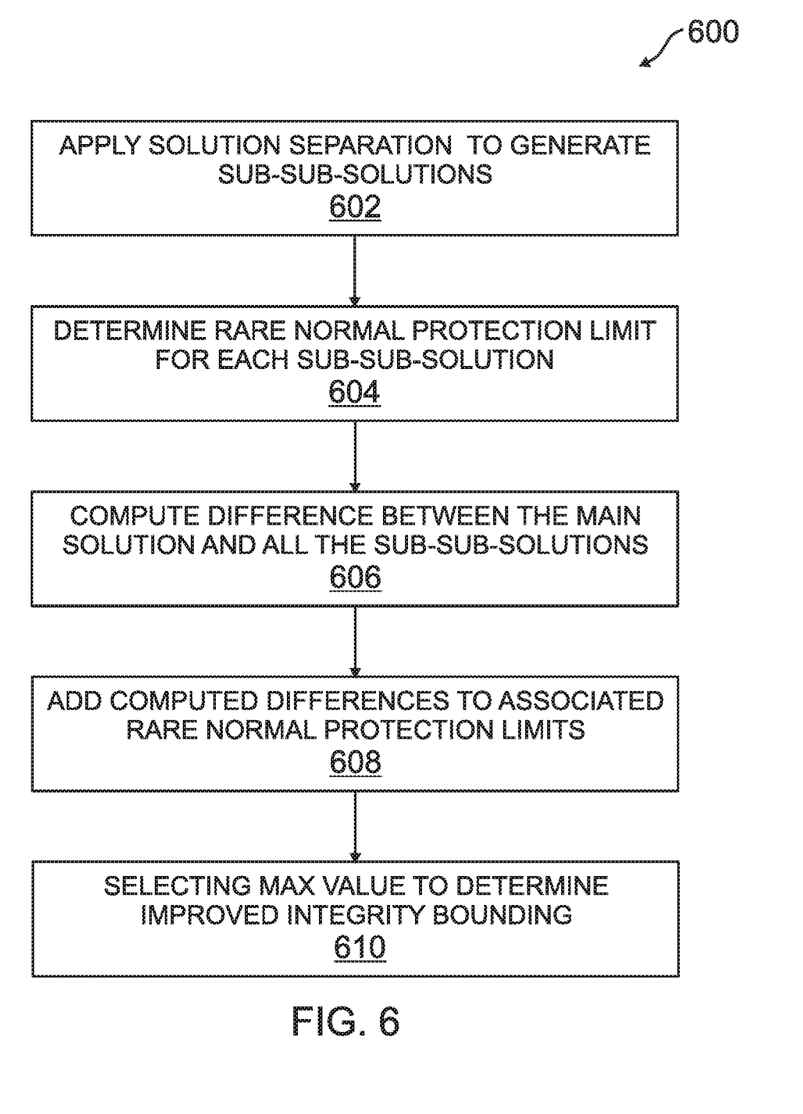
FIG. 6 is a dual fault alternative uncertainty limit flow diagram according to one exemplary embodiment.

Referring to FIG. 6 a dual fault AUL flow diagram 600 of an embodiment is illustrated. The dual fault AUL flow diagram 600 is provided as a series of sequential steps. The sequence may occur in a different order in other embodiments. Hence, embodiments are not limited to the specific sequential order of steps.

At step (602), a solution separation 200 is applied to the received measurement signals to generate sub-sub solutions 206. A rare normal protection limit for each sub-sub solution is determined at step (604). In this step a rare normal H0 protection limit for each sub-sub-solution is determined based on a desired integrity bound probability $P_{bound}$. Based on $P_{bound}$, the probability assigned to a single fault missed detection, $P_{md,sf}$, nr. of sub-solutions, $n_{ss}$, and the probability of dual fault, $p_{df}$, the probability assigned to dual faults missed detection, $P_{md,df}$ and the related sigma multiplier $K_{md,df}$ is computed in an embodiment. An equation for $P_{md,df}$ is as follows:

$$P_{md,df}=(P_{bound}-P_{md,sf})/(n_{ss} \times P_{df})$$

An example is as follows:

$$P_{md,df}=(10^{-7}-5\times10^{-8})/(10\times10^{-5})=5\times10^{-4}$$

The H0 protection limit for each sub-sub solution is computed with the following equation:

$$UL_{par_{md,df}}=K_{md,df}\times\sqrt{P_{par}}$$

Where $P_{par}$ equals the covariance for "par" state of the sub-sub solution.

A difference between the main solution and all sub-sub solution is computed in step (606). An equation is as follows:

$$\Delta_{par}=|X_{par\_main}-X_{par\_sub\_sub\_n}|$$

Where $X_{par\_sub\_sub\_n}$ corresponds to the sub-sub solution.

The computed differences are added to associated rare normal protection limits of the sub-sub solutions in step (608). This is illustrated in the following equation:

$$UL_{par\_H2}=UL_{par_{md,df}}+\Delta_{par}$$

Where H2 represents a hypothesis with two assumed faults present. A max value of the added computed differences and associated rare normal protection limits is selected in Step (610) to determine an improved integrity bounding. That is, the resulting uncertainty limit $UL_{par\_H2}$ combined with AUL and by taking the max value represents the improved integrity bounding.

Example Embodiments

Example 1 is a method for determining and applying alternative uncertainty limits in the presence of a detected satellite fault. The method includes receiving satellite signals from a plurality of satellites; generating a main solution from the received satellite signals; applying a solution separation to generate sub-solutions from the received satellite signals, each sub-solution using all of the satellite signals from the plurality of satellites except one satellite signal from one of the plurality of satellites to generate the associated sub-solution, wherein each sub-solution excludes a different satellite signal from a different satellite from another sub-solution; selecting one sub-solution as fault free; determining a sub-solution integrity bound of the selected sub-solution; determining a difference between the main solution and the selected sub-solution; adding the determined difference to the sub-solution integrity bound to create an improved integrity bounding main solution; and implementing the improved integrity bounding main solution.

Example 2, includes the method of Example 1, wherein the solution of the main solution and the sub-solutions includes at least one of position, velocity and attitude solutions.

Example 3 includes the method of any of the Examples 1-2, furthering including using a bounding limit in selecting the fault free sub-solution.

Example 4 includes the method of any of the Examples 1-3, wherein adding the determined difference to the sub-solution integrity bound to create an improved integrity bounding main solution further includes adding the determined difference to a protection limit.

Example 5 includes the method of Example 4, wherein the protection limit is a rare normal protection limit based on an integrity bound probability.

Example 6 includes the method of any of Example 4, wherein the protection limit is related to a covariance for a parameter state that is associated with the solution.

Example 7 includes the method of any of the Examples 1-6, wherein selecting the one sub-solution as fault free further includes determining the difference between each sub-solution and the main solution; and selecting the sub-solution with the greatest difference.

Example 8 includes the method of any of the Examples 1-7, further including applying the solution separation to generate sub-sub-solutions for each sub-solution, each sub-sub-solution using all of the satellite signals from the plurality of satellites used to determine an associated sub-solution except one satellite signal, wherein each sub-sub-solution excludes a different satellite signal from a different satellite from another sub-sub-solution; determining a rare normal protection limit for each sub-sub-solution based on a desired integrity bound probability; computing a difference between the main solution and all the sub-sub-solutions; adding the computed differences to rare normal protection limits of the respective sub-sub solutions; and determining an improved integrity bounding by selecting a max value of the added computed differences.

Example 9 includes the method of Example 8, wherein determining the rare normal protection limit for each sub-sub-solution based on the desired integrity bound probability further includes determining a rare normal for each sub-sub-solution based at least in part on a covariance for a parameter state of each sub-sub-solution.

Example 10 is another method for computing and applying alternative uncertainty limits. The method includes generating a main solution from a plurality of received measurement signals; applying a solution separation using a filter bank to generate sub-solutions from the received plurality of measurement signals, each sub-solution using all of the measurement signals from the plurality of measurement signals except one measurement signal to generate the associated sub-solution, wherein each sub-solution excludes a different measurement signal; selecting one sub-solution as fault free; determining a difference between the main solution and the selected sub-solution; adding the determined difference to a rare normal protection limit to create a solution with improved integrity bounding; and implementing the solution with improved integrity bounding.

Example 11 includes the method of Example 10, wherein selecting the one sub-solution as fault free further includes comparing differences between the main solution and each sub-solution; and selecting one of the sub-solutions with an associated greatest difference.

Example 12 includes the method of any of the Examples 10-11, wherein the solution of the main solution and the sub-solutions includes at least one of position, velocity and attitude.

Example 13 includes the method of any of the examples 10-12, further including applying the solution separation to generate sub-sub-solutions for each sub-solution, each sub-sub-solution using all of the satellite signals from the plurality of satellites used to determine an associated sub-solution except one satellite signal, wherein each sub-sub-solution excludes a different satellite signal from a different satellite from another sub-sub-solution; determining a rare normal protection limit for each sub-sub-solution based on a desired integrity bound probability; computing a difference between the main solution and all the sub-sub-solutions; adding the computed differences to rare normal protection limits of the respective sub-sub solutions; and determining an improved integrity bounding by selecting a max value of the added computed differences.

Example 14 includes the method of any of the examples 10-13, wherein the plurality of measured signals are received from a plurality of satellites.

Example 15 includes the method of any of the examples 10-14, wherein implementing the solution with improved integrity bounding further includes controlling operations of a vehicle based at least in part on the implementation.

Example 16 includes a navigation system for a vehicle using alternative uncertainty limits in the presence of a detected satellite fault. The navigation system includes at least one receiver, at least one controller, a memory and a navigation control system. The at least one receiver is configured to receive a plurality of measurement signals from a plurality of satellites. The at least one controller is configured to: generate a main solution from a plurality of received measurement signals and apply a solution separation using a filter bank to generate sub-solutions from the received plurality of measurement signals, wherein each sub-solution uses all of the measurement signals from the plurality of measurement signals except one measurement signal to generate the associated sub-solution, further wherein each sub-solution excludes a different measurement signal, select one sub-solution as fault free, determine a difference between the main solution and the selected sub-solution, and add the determined difference to a rare normal protection limit to create a solution with improved integrity bounding. The memory is used to at least in part store instructions implemented by the at least one controller. The navigation control system is configured to have at least in part operational control of the vehicle based at least in part on the solution with improved integrity bounding determined by the at least one controller.

Example 17 includes the navigation system of Example 16 wherein the at least one controller is configured to select the one sub-solution as fault free by, comparing differences between the main solution and each sub-solution and selecting one of the sub-solutions with an associated greatest difference.

Example 18 includes the navigation system of any of the examples 16-17, wherein the solution of the main solution and the sub-solutions includes at least one of position, velocity and attitude.

Example 19 includes the navigation system of any of the examples 16-18, wherein the at least one controller is further configured to: apply the solution separation to generate sub-sub-solutions for each sub-solution, each sub-sub-solution using all of the satellite signals from the plurality of satellites used to determine an associated sub-solution except one satellite signal, wherein each sub-sub-solution excludes a different satellite signal from a different satellite from another sub-sub-solution; determine a rare normal protection limit for each sub-sub-solution based on a desired integrity bound probability; compute a difference between the main solution and all the sub-sub-solutions; add the computed differences to rare normal protection limits of the respective sub-sub solutions; and determine an improved integrity bounding by selecting a max value of the added computed differences.

Example 20 includes the navigation system of any of the examples 16-19, further including at least one measurement information system to provide additional measurement signals used by the at least one controller.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method for determining and applying alternative uncertainty limits in the presence of a detected satellite fault, the method comprising:

receiving satellite signals from a plurality of satellites;

generating a main solution from the received satellite signals;

applying a solution separation to generate sub-solutions from the received satellite signals, each sub-solution using all of the satellite signals from the plurality of satellites except one satellite signal from one of the plurality of satellites to generate the associated sub-solution, wherein each sub-solution excludes a different satellite signal from a different satellite from another sub-solution;
selecting one sub-solution as fault free;
determining a sub-solution integrity bound of the selected sub-solution;
determining a difference between the main solution and the selected sub-solution;
adding the determined difference to the sub-solution integrity bound to create an improved integrity bounding main solution; and
implementing the improved integrity bounding main solution.

2. The method of claim 1, wherein the solution of the main solution and the sub-solutions includes at least one of position, velocity and attitude solutions.

3. The method of claim 1, furthering comprising:
using a bounding limit in selecting the fault free sub-solution.

4. The method of claim 1, wherein adding the determined difference to the sub-solution integrity bound to create an improved integrity bounding main solution further comprises:
adding the determined difference to a protection limit.

5. The method of claim 4, wherein the protection limit is a rare normal protection limit based on an integrity bound probability.

6. The method of claim 4, wherein the protection limit is related to a covariance for a parameter state that is associated with the solution.

7. The method of claim 1, wherein selecting the one sub-solution as fault free further comprises:
determining the difference between each sub-solution and the main solution; and
selecting the sub-solution with the greatest difference.

8. The method of claim 1, further comprising:
applying the solution separation to generate sub-sub-solutions for each sub-solution, each sub-sub-solution using all of the satellite signals from the plurality of satellites used to determine an associated sub-solution except one satellite signal, wherein each sub-sub-solution excludes a different satellite signal from a different satellite from another sub-sub-solution;
determining a rare normal protection limit for each sub-sub-solution based on a desired integrity bound probability;
computing a difference between the main solution and all the sub-sub-solutions;
adding the computed differences to rare normal protection limits of the respective sub-sub solutions; and
determining an improved integrity bounding by selecting a max value of the added computed differences.

9. The method of claim 8, wherein determining the rare normal protection limit for each sub-sub-solution based on the desired integrity bound probability further comprises:
determining a rare normal for each sub-sub-solution based at least in part on a covariance for a parameter state of each sub-sub-solution.

10. A method for computing and applying alternative uncertainty limits, the method comprising:
generating a main solution from a plurality of received measurement signals;
applying a solution separation using a filter bank to generate sub-solutions from the received plurality of measurement signals, each sub-solution using all of the measurement signals from the plurality of measurement signals except one measurement signal to generate the associated sub-solution, wherein each sub-solution excludes a different measurement signal;
selecting one sub-solution as fault free;
determining a difference between the main solution and the selected sub-solution;
adding the determined difference to a rare normal protection limit to create a solution with improved integrity bounding; and
implementing the solution with improved integrity bounding.

11. The method of claim 10, wherein selecting the one sub-solution as fault free further comprises:
comparing differences between the main solution and each sub-solution; and
selecting one of the sub-solutions with an associated greatest difference.

12. The method of claim 10, wherein the solution of the main solution and the sub-solutions includes at least one of position, velocity and attitude.

13. The method of claim 10, further comprising:
applying the solution separation to generate sub-sub-solutions for each sub-solution, each sub-sub-solution using all of the satellite signals from the plurality of satellites used to determine an associated sub-solution except one satellite signal, wherein each sub-sub-solution excludes a different satellite signal from a different satellite from another sub-sub-solution;
determining a rare normal protection limit for each sub-sub-solution based on a desired integrity bound probability;
computing a difference between the main solution and all the sub-sub-solutions;
adding the computed differences to rare normal protection limits of the respective sub-sub solutions; and
determining an improved integrity bounding by selecting a max value of the added computed differences.

14. The method of claim 10, wherein the plurality of measured signals are received from a plurality of satellites.

15. The method of claim 10, wherein implementing the solution with improved integrity bounding further comprises:
controlling operations of a vehicle based at least in part on the implementation.

16. A navigation system for a vehicle using alternative uncertainty limits in the presence of a detected satellite fault, the navigation system comprising:
at least one receiver configured to receive a plurality of measurement signals from a plurality of satellites;
at least one controller configured to,
generate a main solution from a plurality of received measurement signals and apply a solution separation using a filter bank to generate sub-solutions from the received plurality of measurement signals, wherein each sub-solution uses all of the measurement signals from the plurality of measurement signals except one measurement signal to generate the associated sub-solution, further wherein each sub-solution excludes a different measurement signal,
select one sub-solution as fault free,
determine a difference between the main solution and the selected sub-solution, and
add the determined difference to a rare normal protection limit to create a solution with improved integrity bounding;
a memory to at least in part store instructions implemented by the at least one controller; and a navigation control system configured to have at least in part operational control of the vehicle based at least in part on the solution with improved integrity bounding determined by the at least one controller.

17. The navigation system of claim 16, wherein the at least one controller is configured to select the one sub-solution as fault free by,
   comparing differences between the main solution and each sub-solution and
   selecting one of the sub-solutions with an associated greatest difference.

18. The navigation system of claim 16, wherein the solution of the main solution and the sub-solutions includes at least one of position, velocity and attitude.

19. The navigation system of claim 16, wherein the at least one controller is further configured to,
   apply the solution separation to generate sub-sub-solutions for each sub-solution, each sub-sub-solution using all of the satellite signals from the plurality of satellites used to determine an associated sub-solution except one satellite signal, wherein each sub-sub-solution excludes a different satellite signal from a different satellite from another sub-sub-solution;
   determine a rare normal protection limit for each sub-sub-solution based on a desired integrity bound probability;
   compute a difference between the main solution and all the sub-sub-solutions;
   add the computed differences to rare normal protection limits of the respective sub-sub solutions; and
   determine an improved integrity bounding by selecting a max value of the added computed differences.

20. The navigation system of claim 16, further comprising:
   at least one measurement information system to provide additional measurement signals used by the at least one controller.

* * * * *